United States Patent
Chauvicourt (10) Patent No.: US 11,913,826 B2
(45) Date of Patent: Feb. 27, 2024

(54) METHOD AND APPARATUS FOR ESTIMATING ELECTROMAGNETIC FORCES ACTIVE IN AN ELECTRIC MACHINE

(71) Applicant: Siemens Industry Software NV, Leuven (BE)

(72) Inventor: Fabien Chauvicourt, Kessel Lo (BE)

(73) Assignee: Siemens Industry Software NV, Leuven (BE)

( * ) Notice: Subject to any disclaimer, the term of this patent is extended or adjusted under 35 U.S.C. 154(b) by 13 days.

(21) Appl. No.: 17/628,672

(22) PCT Filed: Jul. 22, 2019

(86) PCT No.: PCT/EP2019/069670
§ 371 (c)(1),
(2) Date: Jan. 20, 2022

(87) PCT Pub. No.: WO2021/013331
PCT Pub. Date: Jan. 28, 2021

(65) Prior Publication Data
US 2022/0260412 A1   Aug. 18, 2022

(51) Int. Cl.
*G01H 1/00* (2006.01)
*H02K 11/20* (2016.01)

(52) U.S. Cl.
CPC ............ *G01H 1/003* (2013.01); *H02K 11/20* (2016.01)

(58) Field of Classification Search
CPC .................. G01H 1/003; H02K 11/20
See application file for complete search history.

(56) References Cited

U.S. PATENT DOCUMENTS

| 4,294,120 A * | 10/1981 | Shima | G01H 1/003 |
| | | | 73/650 |
| 7,298,110 B2 * | 11/2007 | Lindsey | H02K 11/33 |
| | | | 318/495 |

(Continued)

FOREIGN PATENT DOCUMENTS

| CN | 104362918 A | 2/2015 |
| JP | H11160145 A | 6/1999 |
| WO | 2019102545 A1 | 5/2019 |

OTHER PUBLICATIONS

Notification Of Transmittal Of The International Preliminary Report On Patentability for International Application No. PCT/EP2019/069670 dated Oct. 11, 2021.

(Continued)

*Primary Examiner* — John E Breene
*Assistant Examiner* — Yaritza H Perez Bermudez
(74) *Attorney, Agent, or Firm* — Lempia Summerfield Katz LLC (57) ABSTRACT

A method and apparatus for estimating electromagnetic forces active in an electric machine. The method includes the steps of: measuring at least one first operation parameter of the electric machine while the electric machine is operated under at least one operational condition, and estimating electromagnetic forces active in an electric machine during operation of the electric machine by multiplying the measured at least one first operation parameter and a respective second operation parameter provided by a stored structural/vibro-acoustic model.

16 Claims, 2 Drawing Sheets

(56) References Cited

U.S. PATENT DOCUMENTS

| | | | | |
|---|---|---|---|---|
| 7,357,031 | B2* | 4/2008 | Trionfetti | B24B 41/04 |
| | | | | 73/660 |
| 7,952,313 | B2* | 5/2011 | Fujishiro | H02P 31/00 |
| | | | | 318/563 |
| 8,453,764 | B2* | 6/2013 | Turner | G05B 13/048 |
| | | | | 702/9 |
| 8,913,344 | B1* | 12/2014 | Parsoneault | G11B 19/2036 |
| | | | | 360/99.08 |
| 9,160,215 | B2* | 10/2015 | Brown | H02K 11/20 |
| 9,484,791 | B2* | 11/2016 | Brockerhoff | H02K 11/35 |
| 9,841,278 | B2* | 12/2017 | Britte | G01B 7/30 |
| 10,005,317 | B2* | 6/2018 | Biderman | B60Q 9/00 |
| 10,072,992 | B2* | 9/2018 | Faria | G01K 1/14 |
| 10,423,730 | B2* | 9/2019 | Heirman | G06F 30/23 |
| 10,684,193 | B2* | 6/2020 | Stansloski | G01M 1/22 |
| 11,032,657 | B2* | 6/2021 | Knechten | H04R 29/003 |
| 11,078,978 | B2* | 8/2021 | Chandrasekara | F16D 66/00 |
| 11,187,619 | B2* | 11/2021 | dos Santos | G01H 1/00 |
| 11,493,379 | B2* | 11/2022 | Yoskovitz | G01N 29/14 |
| 2004/0243332 | A1* | 12/2004 | Shen | G01H 1/003 |
| | | | | 702/85 |
| 2007/0163351 | A1* | 7/2007 | Wu | G01H 17/00 |
| | | | | 73/649 |
| 2009/0204355 | A1 | 8/2009 | Vold | |
| 2009/0276197 | A1 | 11/2009 | Janssens et al. | |
| 2012/0048026 | A1* | 3/2012 | van der Linden | G01M 7/025 |
| | | | | 73/760 |
| 2013/0298690 | A1 | 11/2013 | Bond et al. | |
| 2019/0188345 | A1* | 6/2019 | Kim | G01M 13/045 |

OTHER PUBLICATIONS

PCT International Search Report and Written Opinion of International Searching Authority dated Apr. 21, 2020, corresponding to PCT International Application No. PCT/EP2019/069670 filed Jul. 22, 2019.

* cited by examiner

METHOD AND APPARATUS FOR ESTIMATING ELECTROMAGNETIC FORCES ACTIVE IN AN ELECTRIC MACHINE

CROSS REFERENCE TO RELATED APPLICATIONS

This present patent document is a § 371 nationalization of PCT Application Serial Number PCT/EP2019/069670, filed Jul. 22, 2019, designating the United States, which is hereby incorporated in its entirety by reference.

FIELD

Embodiments relates to a method and apparatus for estimating electromagnetic forces active in an electric machine.

BACKGROUND

The suppression of undesirable noise and vibration caused by electric machines, for example by rotating electric machines has been an important research issue in auto industry. It is due to the increasing ubiquity of electrified components inside a passenger vehicle. The electromagnetic forces in electric machines may be responsible for high vibration and/or noise, that may result in acoustic disturbances for the passengers or to any other person around the electric machine. Reducing high vibration and/or noise needs a prediction of the electromagnetic forces, for example, in the area where they occur.

Measuring electromagnetic (EM) forces in rotating electric machines through common sensing technologies is not feasible. The electromagnetic forces occur between the stator and the rotor of the electric machines, for example between the rotor teeth and stator teeth. A common sensing technology for measuring electromagnetic forces is called "force transducer". The forces determined in electric machines have magnitudes of several tenths of kilo-Newtons. For that, the transducers are larger than 30 mm of size, while the air gap between the stator and rotor is usually between 0.3 mm and 3 mm that is a first limitation for usage. A second limitation of these common sensing comes from the fact that, due to their functioning principle (electrical resistor forms strain gauge), they are sensible to the magnetic field, generated at the air gap, that is significantly high at these air gaps of the rotating electric machines and will substantially affect the sensor outputs.

From US 2012/048026 A1 a method for determining loads using inverse dynamic calibration is known. From US 2009/276197 A1, CN 104 362 918 A, JP H11 160145 A, US 2009/204355 A1, US 2013/298690 A1 respectively aspects of load determination are known.

Figure 2:
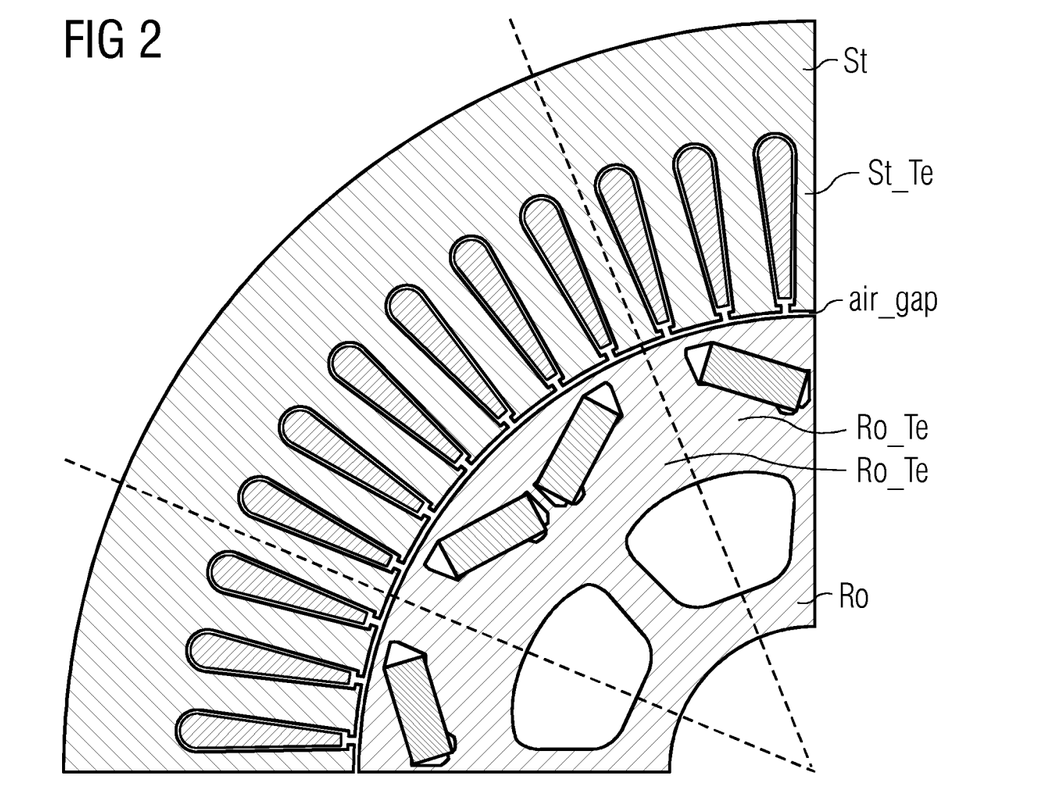
FIG. 2 depicts a block diagram of an electric machine.

FIG. 2 depicts an electric machine including a stator St and a rotor Ro. In the stator, the stator teeth St_Te are formed. In the rotor, the rotor teeth Ro_Te are formed. Between the stator teeth and the rotor teeth, the air gap is formed. The air gap size is usually between 0.3 mm to 3 mm.

Due to the aforementioned reason, electromagnetic forces are never measured. Eventually, a way that is sometimes used to estimate electromagnetic forces is to measure the polyphase currents that would feed an electromagnetic finite element model for magneto static analyses. However, using this process, the physical output, e.g., vibrations of such estimated forces are not correlated with the physical input, e.g., current, making the estimation of the electromagnetic forces not completely robust nor validated.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide an improved and efficient method and an apparatus that allows prediction of electromagnetic forces active in electric machines.

Embodiments provide in a first aspect a method for estimating electromagnetic forces active in an electric machine during operation of the electric machine, the method including the steps of:

Measuring at least one first operation parameter of the electric machine while the electric machine is operated under at least one operational condition, and Estimating electromagnetic forces active in an electric machine during operation of the electric machine by multiplying the measured at least one first operation parameter and a respective second operation parameter provided by a stored structural/vibro-acoustic model.

An electric machine may be used for the traction of an electric vehicle. In a further arrangement, the electric machine may include auxiliaries of the vehicle, such as, air compressor, hybrid booster etc. The method and apparatus described herein may also be used to estimate electromagnetic forces within high-speed electric machines.

As used herein, "during operation of the electric machine" includes that the electric machine is operating with a specific rotational speed and a specific torque value dependent on the operation task and load connected to the electric machine. The electric machine may be operated under several configurable rotational speed values and/or several configurable torque values.

The electromagnetic force is responsible for most of the interactions that may be seen in the environment. The electromagnetic force holds electrons in their orbit around the nucleus. These electrons interact with other electrons to form electron bonds among elements and produce molecules and, eventually, visible matter. The electromagnetic force, also called the Lorentz force, explains how both moving and stationary charged particles interact. The electromagnetic force includes the formerly distinct electric force and the magnetic force.

As used herein, a "structural/vibro-acoustic model" may be understood to be an abstract model that organizes elements of data and standardizes how these elements relate to one another and to properties of the electric machine. The structural/vibro-acoustic model may describe a dataset relevant to the electric machine in a specific manner as well as includes data describing and/or specifying functionalities and/or the relations of the electric machine. For example, the structural/vibro-acoustic model includes data that may be updated. The structural/vibro-acoustic model may be implemented in a database stored on a local or centralized computer. The database may be further stored in a distributed database on a distributed server system or cloud system.

With the method and apparatus, it is possible to estimate forces occurring in the electric machine without relying on a non-updated electromagnetic model. Moreover, the presented technique is quick and allows system level integration of electric machines whining noise simulation and later enabling condition monitoring purposes to be performed in real-time environment.

In addition, embodiments provide by estimating the forces in electric machines monitoring operation condition of the electric machines and trouble shooting in case of detected unknown and/or undesired electromagnetic forces within the electric machine.

Further, embodiments may support applications where conformity is quite important. For instance, in the car industry the electromagnetic forces and/or force shapes, that has the greatest contribution on the annoying noise component may be detected. If these are detected or identified, it is possible to apply several control strategies to monitor these electromagnetic forces as well as it is possible to reconsider, modify and/or redesign the structure of the component and/or electric machine causing the electromagnetic force. Due to the detected or identified electromagnetic forces, a modification of the structure may be used to remove resonances or shift the resonances to higher frequencies.

In an embodiment, it is possible to detect which electromagnetic force affect which kind of frequencies. As a relation of the electric machine. For example, the structural/vibro-acoustic model includes data that may be updated. The structural/vibro-acoustic model may be implemented in a database stored on a local or centralized computer. The database may be further stored in a distributed database on a distributed server system or cloud system.

With the method and apparatus, it is possible to estimate forces occurring in the electric machine without relying on a non-updated electromagnetic model. Moreover, the presented technique is quick and allows system level integration of electric machines whining noise simulation and later enabling condition monitoring purposes to be performed in real-time environment.

In addition, the embodiments provide by estimating the forces in electric machines monitoring operation condition of the electric machines and trouble shooting in case of detected unknown and/or undesired electromagnetic forces within the electric machine.

Further, embodiments may support applications where conformity is quite important. For instance, in the car industry the electromagnetic forces and/or force shapes, that has the greatest contribution on the annoying noise component may be detected. If these are detected or identified, it is possible to apply several control strategies to monitor these electromagnetic forces as well as it is possible to reconsider, modify and/or redesign the structure of the component and/or electric machine causing the electromagnetic force. Due to the detected or identified electromagnetic forces, a modification of the structure may be used to remove resonances or shift the resonances to higher frequencies.

In an embodiment, it is possible to detect which electromagnetic force affect which kind of frequencies. In an embodiment, at least one unitary force is applied to the structural/vibro-acoustic model and the at least one unitary force corresponds to the respective at least one intrinsic behavior of the electric machine. The updated structural/vibro-acoustic model is used in conjunction with unitary force waves representative of the typical loads of an electric machine to obtain normalized vibration/acoustic output. The force waves are manually generated. All the force waves represent a particular shape component that are all put together and form the total force wave. Each force amplitude of the force waves is normalized to generate a unit energy load for every frequency line of a broadband spectrum.

Thus, applying these forces to the updated model, the vibration/acoustic output is obtained for each force shape.

In an embodiment, the operational condition includes a plurality of certain torque parameters of the electric machine and/or a plurality of certain speed parameters of the electric machine. In this way, in a testing phase data are measured from a running electric machine under operational condition to receive real life data. The received real life data provides noise and/or vibration information within certain torque parameters and/or certain speed parameters of the electric machine. Specific noise or vibration may be detected and analyzed as well as structural defects and disturbance resulting from the detected noise or vibration may be identified and remedied. The operational condition may be configurable or include a static value.

In an embodiment, the operational condition is configurable by using a ramping up or slowing down function. In this way, the operational condition is dynamically configurable by varying the speed by ramping up or slowing down.

In an embodiment, the at least first operation parameter includes at least acoustic pressure and/or vibration values caused by acceleration of the electric machine. Acoustic pressure and vibration values caused by acceleration of the electric machine may be measured. The acceleration may be configurable, such as, each acceleration value that cause acoustic pressure and vibration may be measured.

In an embodiment, the at least first operation parameter includes at least acoustic pressure and/or vibration values caused by velocity of the electric machine. Acoustic pressure and vibration values caused by velocity of the electric machine may be measured. The velocity may be configurable, such as, each acceleration value that cause acoustic pressure and vibration may be measured.

In an embodiment, the at least first operation parameter includes at least acoustic pressure and/or vibration values caused by displacement of the electric machine. Acoustic pressure and vibration values caused by displacement of the electric machine may be measured. In this way, acoustic pressure and vibration caused by displacement of the electric machine may be measured.

In an embodiment, an accelerometer is used to measure the vibration values. An accelerometer is a sensor that measures its acceleration. This is usually done by determining the inertial force acting on a test mass. Thus, for example, it may be determined whether there is an increase or decrease in speed. The acceleration estimation may depend on the accelerometer technology. Usually Piezoelectric (PE) accelerometers are used and use the fact that the instantaneous stress (generated by changes in acceleration) on the PE element produces a charge that is proportional to the acceleration. This charge goes to the electrical terminals of the sensor, thus giving voltage to measure digital signal. In this way the acceleration may be measured and provided as a digital signal.

In an embodiment, a microphone is used to measure the acoustic pressure. A microphone is a sound transducer that converts airborne sound as sound pressure oscillations into corresponding electrical voltage changes as a microphone signal. In this way the acoustic pressure may be measured and provided as a digital signal.

In an embodiment, the structural/vibro-acoustic model includes the shape of the electric machine. A shape may be a mode shape and may refer to shapes and natural frequencies. Usually, the shapes and natural frequencies are obtained by solving the so-called equation of motion of the system (electric machine). They form the eigen-vectors and eigen-frequencies of the mathematical system.

In an embodiment, the structural/vibro-acoustic model includes the structure of the electric machine. The structure describes the electric machine components assembled together (stator, rotor, winding, housing, etc.). The electric machine components are modelled independently or together, depending on the model used. The models also require the material mechanical properties of each component (stiffness, mass, damping).

In an embodiment, the structural/vibro-acoustic model includes the pressure of the structure from the electric machine. The vibration of the machine generates vibrations of the medium around it (air usually), that produces pressure fluctuation, eventually leading to acoustic noise. The acoustic pressure model then requires the surrounding medium properties, and is usually calculated away from the machine.

In an embodiment, the experimental modal analysis includes an application of an external physical force to the electric machine. In this way, the reaction of the electric machine for example to the external physical force may be observed and measured. The external physical force may by physical stress caused by a hammer or shaker to the electric machine. The experimental modal analysis deals with the functional relationships between the technique and the environment. The experimental modal analysis is used to describe, explain, predict and control behavior. The behavior may be understood by the function of the behavior and in what context the behavior occurs.

In an embodiment, the experimental modal analysis includes an application of an external physical force to single components of the electric machine. In this way reaction of, for example a single component of the electric machine due to the affect caused by the external physical force may be measured.

In an embodiment, the experimental modal analysis includes measuring the vibration/acoustic output of the electric machine. The experimental modal analysis is used to update the stored structural/vibro-acoustic model. In the experimental modal analysis, the shape and frequencies between the two aspects (experimental and model) are correlated.

Further, the stored structural/vibro-acoustic model is used in conjunction with unitary forces to obtain the normalized vibration/acoustic output. By applying the unitary forces to the stored structural/vibro-acoustic model, the vibration/acoustic output is obtained for each force shape.

In an embodiment, the experimental modal analysis includes estimating the intrinsic behavior of the electric machine. Each structure does have any intrinsic behavior that does not depend on forces. The intrinsic behavior may be used to update the stored structural/vibro-acoustic model.

In an embodiment, the at least one unitary force represents certain loads of an electric machine. The unitary forces include forces of one Newton amplitude. The unitary forces are generated with particular shapes and applied to the stored structural/vibro-acoustic model. In this way, for each applied unitary force, one vibration response is supplied corresponding to a specific force shape. The electromagnetic force may be reconstructed from the specific force shapes.

Up to now, embodiments have been described with respect to the claimed method. Features, advantages or alternative embodiments herein may be assigned to the other objects (e.g., the computer program or a device, i.e., the apparatus or a computer program product) and vice versa. In other words, the subject matter or described with respect to the device may be improved with features described in the context of the method and vice versa. In this case, the functional features of the method are embodied by structural units of the system and vice versa, respectively. In computer science a software implementation and a corresponding hardware implementation are equivalent. Thus, for example, a method step for "storing" data may be performed with a storage unit and respective instructions to write data into the storage. For the sake of avoiding redundancy, although the apparatus may also be used in the alternative embodiments described with reference to the method, these embodiments are not explicitly described again for the apparatus.

Embodiments further provide a second aspect including an apparatus for estimating electromagnetic forces active in an electric machine during operation of the electric machine.

Embodiments provide according to the second aspect an apparatus for estimating electromagnetic forces active in an electric machine during operation of the electric machine, including: a measuring unit, configured to measure at least one first operation parameter of the electric machine while the electric machine is operated under at least one operational condition, and an estimating unit, configured to estimate electromagnetic forces active in an electric machine during operation of the electric machine by multiplying the measured at least one first operation parameter and a respective second operation parameter provided by a stored structural/vibro-acoustic model.

Embodiments provide according to a third aspect a system for estimating electromagnetic forces active in an electric machine during operation of the electric machine.

Embodiments further provide according to the third aspect a system for estimating electromagnetic forces active in an electric machine during operation of the electric machine including: an electric machine. The electric machine includes an electric motor powered by direct current sources or by alternating current and an apparatus according to the second aspect.

Embodiments further provide according to a fourth aspect a computer program product for estimating electromagnetic forces active in an electric machine during operation of the electric machine.

In the fourth aspect the embodiments relate to a computer program product including a computer program, the computer program being loadable into a memory unit of a computing unit, including program code sections to make the computing unit execute the method for estimating electromagnetic forces active in an electric machine during operation of the electric machine according to the first aspect, when the computer program is executed in the computing unit.

Not all steps of the method necessarily have to be performed on the same component or computer instance, but may also be performed on different computer instances.

In addition, it is possible that individual steps of the method described above may be carried out in one unit and the remaining components in another unit, as a distributed system.

The properties, features and advantages of the embodiments described above, as well as the manner they are achieved, become clearer and more understandable in the light of the following description and embodiments, that will be described in more detail in the context of the drawings. This following description does not limit the contained embodiments. Same components or parts may be labeled with the same reference signs in different figures. In general, the figures are not for scale. It shall be understood that an embodiment may also be any combination of the dependent claims or above

BRIEF DESCRIPTION OF THE FIGURES

In the following possible embodiments of the different aspects are described in more detail with reference to the enclosed figures.

DETAILED DESCRIPTION

Figure 1:
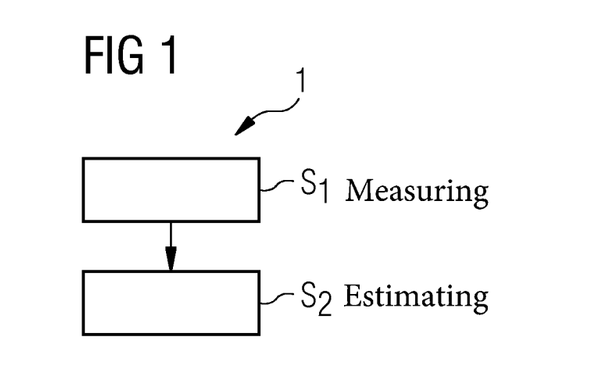
FIG. 1 depicts a flowchart of an embodiment of a method for estimating electromagnetic forces active in an electric machine during operation of the electric machine.

FIG. 1 depicts schematically a flowchart of an embodiment of a method for estimating electromagnetic forces active in an electric machine during operation of the electric machine. Electromagnetic forces active may be understood as forces that occurs while the electric machine 20 is under current and voltage as well as in motion, and therefore in operation. The operation may be with or without load connected to the electric machine 20.

The method includes in the depicted embodiment several steps. In a first step S1, at least one first operation parameter $Y_{tot}$ of the electric machine 20 is measured while the electric machine 20 is operated under at least one operational condition. The at least one first operation parameter $Y_{tot}$ depending on the frequency co describes the vibration response including, e.g., acceleration, velocity, displacement, or the acoustic response, e.g., pressure, measured on the outer surface of the electric machine 20 and around the electric machine 20 under operation of the electric machine 20. The frequency co is the frequency (in rad/s) at which the measurement and simulation of the method are evaluated.

In a further step S2, the electromagnetic forces $F_{tot}$ active in an electric machine 20 during operation of the electric machine 20 are estimated by multiplying the measured at least one first operation parameter $Y_{tot}$ and a respective second operation parameter provided by a stored structural/vibro-acoustic model M. The second operation parameter provided by the stored structural/vibro-acoustic model M may include the vibration or acoustic response obtained from the vibro-acoustic analysis performed using the applied unitary forces $F_{u,I}$ and the stored structural/vibro-acoustic model M. The applied unitary forces $F_{u,I}$ are as well dependent of the frequency co. The unitary forces $F_{u,I}$ are unitary forces of amplitude 1 N applied to the stored structural/vibro-acoustic model M, that corresponds to spatial shapes with 1, 2, 3, . . . lobes respectively. The electromagnetic forces $F_{tot}$ include the total estimated force that applies under operating conditions.

Figure 3:
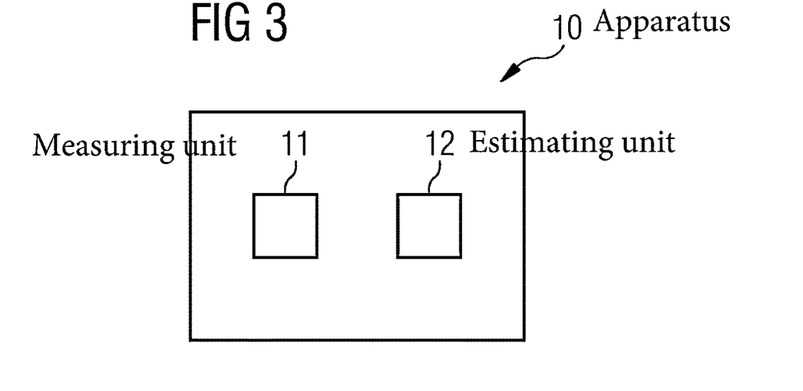
FIG. 3 depicts a block diagram of an embodiment of an apparatus for estimating electromagnetic forces active in an electric machine during operation of the electric machine.

FIG. 3 depicts schematically a block diagram of an embodiment of an apparatus 10 for estimating electromagnetic forces active in an electric machine 20 during operation of the electric machine 20.

As may be seen from the block diagram of FIG. 3, the apparatus 10 is used for estimating electromagnetic forces $F_{tot}$ active in an electric machine 20 during operation of the electric machine 20.

The apparatus 10 includes in the illustrated embodiment a measuring unit 11 and an estimating unit 12. The measuring unit 11 is configured to measure at least one first operation parameter $Y_{tot}$ of the electric machine 20 while the electric machine 20 is operated under at least one operational condition. The estimating unit 12 is configured to estimate electromagnetic forces $F_{tot}$ active in an electric machine 20 during operation of the electric machine 20 by multiplying the measured at least one first operation parameter $Y_{tot}$ and a respective second operation parameter provided by a stored structural/vibro-acoustic model M.

The apparatus for estimating electromagnetic forces $F_{tot}$ active in an electric machine 20 during operation of the electric machine 20 may be a computer, personal computer or a workstation in a computer network and includes a central processing unit, a system memory, and a system bus that couples various system components including the system memory to the central processing unit. The system bus may be any of several types of bus structures including a memory bus or memory controller, a peripheral bus, and a local bus using any of a variety of bus architectures. The system memory may include read only memory (ROM) and/or random-access memory (RAM). A basic input/output system (BIOS), containing basic routines that help to transfer information between elements within the personal computer, such as during start-up, may be stored in ROM. The computer may also include a hard disk drive for reading from and writing to a hard disk. The hard disk drive may be coupled with the system bus by a hard disk drive interface. The drive and its associated storage media provide nonvolatile storage of machine-readable instructions, data structures, program modules and other data for the computer. Although the environment described herein employs a hard disk, those skilled in the art will appreciate that other types of storage media, such as flash memory cards, digital video disks, random access memories (RAMs), read only memories (ROM), and the like, may be used instead of, or in addition to, the storage devices introduced above. A number of program modules may be stored on the hard disk, ROM or RAM, such as an operating system, one or more application programs, like the method for estimating and/or other program modules, and/or program data for example.

The measuring unit 11 and the estimating unit 12 may be implement as a single instance or as different instances on the central processing unit. In a further example, the measuring unit 11 and the estimating unit 12 may be implemented on different central processing units of a computer and/or on chips configured to incorporate the measuring unit 11 and estimating unit 12.

In a further embodiment, the apparatus 10 may include an interface configured to connect an accelerometer to measure the vibration values and/or to connect a microphone to measure the acoustic pressure.

In a further embodiment, the apparatus 10 may include a memory to store the structural/vibro-acoustic model M.

Figure 4:
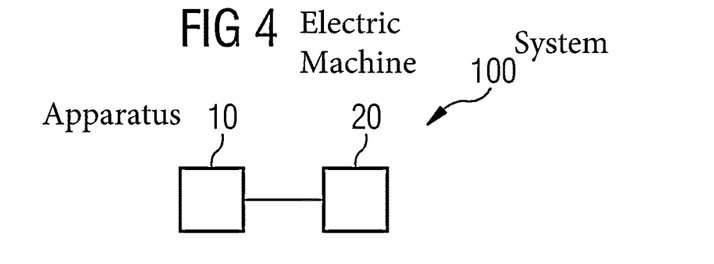
FIG. 4 depicts a block diagram of an embodiment of a system for estimating electromagnetic forces active in an electric machine during operation of the electric machine.

FIG. 4 depicts a block diagram of an embodiment of a system 100 for estimating electromagnetic forces active in an electric machine 20 during operation of the electric machine 20.

As may be seen from the block diagram of FIG. 4, the system 100 is used for estimating electromagnetic forces $F_{tot}$ active in an electric machine 20 during operation of the electric machine 20.

The system 100 includes an electric machine 20. The electric machine 20 includes in an embodiment an electric motor powered by direct current sources. In an alternative embodiment, the electric machine 20 includes an electric motor powered by alternating current. The system 100 further includes an apparatus 10.

Figure 5:
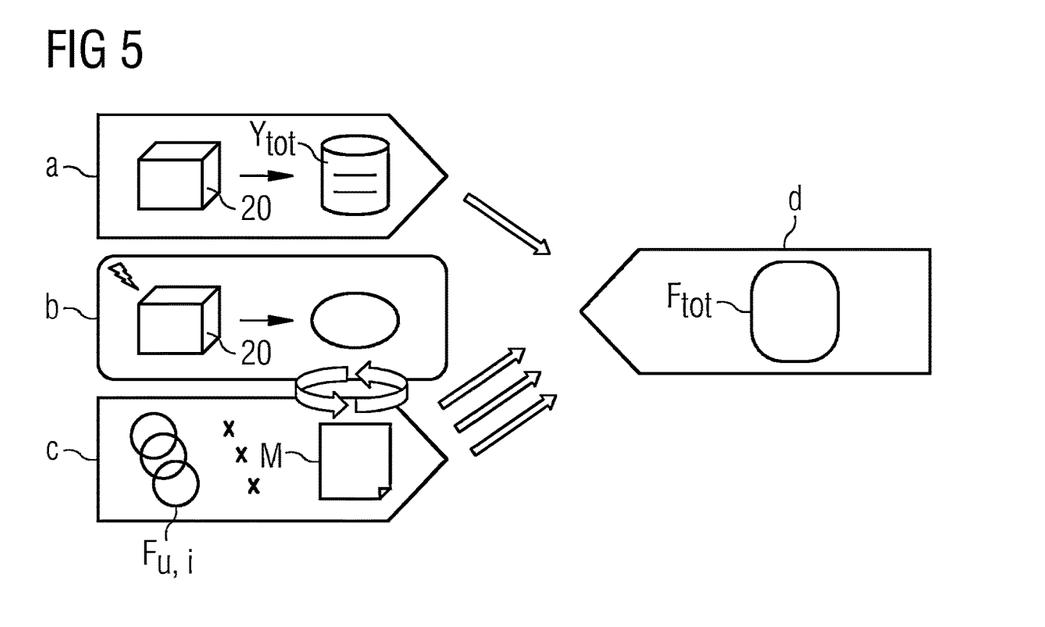
FIG. 5 depicts a schematic diagram of an example for illustrating the operation of a method and an apparatus estimating electromagnetic forces active in an electric machine during operation of the electric machine according to an embodiment.

FIG. 5 depicts a schematic diagram of a specific example for illustrating the operation of a method 1 and an apparatus 10 estimating electromagnetic forces active in an electric machine 20 during operation of the electric machine 20.

In FIG. 5 the operation of the method 1 is shown including four operation steps a to d. The method combines a testing phase and a simulation phase. The testing phase includes the operation steps a and b and the simulation phase includes operation step c. From the results of the testing phase and the simulation phase, the electromagnetic forces $F_{tot}$ may be estimated in the operation step d. The sequence of the operational steps a to c may be varied if necessary.

In operational step a, vibration data and/or acoustic data specific for an electric machine 20 to be evaluated are experimentally gathered for at least one operational condition. The operational condition may include a plurality of certain torque parameters of the electric machine 20 and/or a plurality of certain speed parameters of the electric machine 20. The operational step a is performed with a running electric machine under current and voltage. The operational condition is configurable and may be configured by using a ramping up or slowing down function. Advantageously, the operational step a may provide real life data from the electric machine 20. While the operational step a is performed, at least one first operation parameter $Y_{tot}$ may be measured. The at least one first operation parameter $Y_{tot}$ may include at least acoustic pressure and/or vibration values. The first operational parameter $Y_{tot}$ depends on the frequency ω. The first operation parameter $Y_{tot}(\omega)$ is the vibration response (acceleration, velocity, displacement) or acoustic response (pressure) measured on the outer surface of the machine and around the electric machine under operation. The frequency ω is the frequency (in rad/s) at which the measurement and simulation are evaluated. The acoustic pressure and/or vibration values may be caused by at least one of acceleration of the electric machine 20, velocity of the electric machine 20, and/or displacement of the electric machine 20. The acceleration of the electric machine may be measured, for instance by an accelerometer and the acoustic pressure may be measured, for instance by a microphone, that is placed around the electric machine 20. In the operational step a, a testing is performed including changes in speed and torque of the electric machine 20 to find the required operating point with the vibration and noise, that are disturbing. The operational step a may be performed in method step S1.

In operational step b, an experimental modal analysis is performed. With respect to the experimental modal analysis a structural/vibro-acoustic model M is generated and/or updated. The structural/vibro-acoustic model M is generated by using at least one intrinsic behavior of the electric machine 20 determined within the experimental modal analysis. The experimental modal analysis is performed while the electric machine 20 is in a stationary state. In the experimental modal analysis, the intrinsic behavior of the structure (electric machine 20), that does not depend on any forces is tested. The intrinsic behavior describes a specific behavior of the electric machine 20 under a specific condition, while the machine is in a stationary state. In the stationary state, the electric machine 20 is without current and voltage as well as without any motion. The specific condition (represented in FIG. 5 by the flash) may include a physical stress on the structure caused for instance by a hammer. Further tools and/or actions may be used to detect the intrinsic behavior of the electric machine. After hitting the electric machine or structure, for instance with a hammer, the vibration data and/or pressure data created by the electric machine may be detected and collected. A software- and analysis algorithm may be used to determine the corresponding shapes (oval circle) for the detected and collected vibration data and/or pressure data. The shapes are determined at different frequencies co. The shapes and frequencies co are used to update. The structural/vibro-acoustic model M may be stored in a database locally or centralized.

In operational step c, a structural/vibro-acoustic model M update is performed (circle arrow), so that the structural/vibro-acoustic model M fits exactly what has been measured in operational step b. The correct shapes and frequencies co, for example the natural frequencies of the structure measured in operational step b are embedded in the structural/vibro-acoustic model M. Further, in operational step c, unitary forces $F_{u,i}(\omega)$ are applied to the structural/vibro-acoustic model M. The unitary forces $F_{u,i}(\omega)$ are generated manually with the particular shape corresponding to the similar shape generated in operational step b. The unitary forces $F_{u,i}(\omega)$ are unitary forces of an amplitude 1 N applied to the structural/vibro-acoustic model M, that corresponds to the spatial shapes. For instance, if shapes 1, 2, and 3 are determined, three unitary forces $F_{u,1}(\omega)$, $F_{u,2}(\omega)$, and $F_{u,3}(\omega)$ are applied to the structural/vibro-acoustic model M.

In operational step c, the updated structural/vibro-acoustic model M is used in conjunction with the unitary force waves $F_{u,i}(\omega)$ representative of the typical loads of the electric machine 20 to obtain normalized vibration/acoustic output. The manually generated force waves represent a particular shape component that, all put together, form the total force wave. That means that the force may be reconstructed from the shapes. Each force amplitude is normalized to generate a unit energy load for every frequency ω line of a broadband spectrum. Thus, applying the unitary forces $F_{u,i}(\omega)$ to the updated structural/vibro-acoustic model M, the vibration/acoustic output $Y_{u,i}(\omega)$ is obtained for each force shape. Therefore, according to the number of shapes corresponding vibrations or acoustic responses $Y_{u,1}(\omega)$, $Y_{u,2}(\omega)$, . . . , $Y_{u,i}(\omega)$ are provided. $Y_{u,i}(\omega)$ are the vibration or acoustic response obtained from the vibro-acoustic analysis performed using the unitary forces $F_{u,i}(\omega)$ and the stored structural/vibro-acoustic model M.

In operational step d, by multiplying the vibration/acoustic output $Y_{u,i}(\omega)$ to the operational load including the first operation parameter $Y_{tot}$ of operational step a, the electromagnetic forces $F_{tot}$ may be estimated, respectively back-calculated. $F_{tot}(\omega)$ as the total estimated force that applies under operating condition may be estimated by performing an inverse vibration synthesis using the following equation:

$$Y_{tot}(\omega) = F_K(\omega) \times Y_{u,i}(\omega).$$

$F_K(\omega)$ is the estimated force component of shape K that apply under operating condition. From the equation, the vibration response may be estimated from a summation of the estimated force with a vibration or acoustic response for each force shape. The inverting matrix may be used to collect $F_{tot}(\omega) = \Sigma F K(\omega)$. To ensure invertibility of the matrix to estimate the electromagnetic forces $F_{tot}(\omega)$, it is required to take particular care of the number of measured outputs denoted by the size of $Y_{tot}(\omega)$.

Embodiments relate to method and apparatus for estimating electromagnetic forces active in an electric machine. The method includes the steps of:

Measuring (S1) at least one first operation parameter ($Y_{tot}$) of the electric machine (20) while the electric machine (20) is operated under at least one operational condition, and Estimating (S2) electromagnetic forces ($F_{tot}$) active in an electric machine (20) during operation of the electric machine (20) by multiplying the measured at least one first operation parameter ($Y_{tot}$) and a respective second operation parameter provided by a stored structural/vibro-acoustic model (M).

Electromagnetic forces within an electric machine, for example in the air gaps between the stator and rotor of the electric machine may be measured and disturbing noises and/or vibration resulting from the electromagnetic forces may be identified as well as eliminated.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for estimating electromagnetic forces active in an electric machine during operation of the electric machine, the method comprising:
   measuring at least one first operation parameter of the electric machine while the electric machine is operated under at least one operational condition, and
   estimating electromagnetic forces active in the electric machine during operation of the electric machine by multiplying the measured at least one first operation parameter and a respective second operation parameter provided by a structural/vibro-acoustic model that is generated, adjusted, or generated and adjusted by using at least one intrinsic behavior of the electric machine determined within an experimental modal analysis;
   wherein at least one unitary force is applied to the structural/vibro-acoustic model and the at least one unitary force corresponds to the respective at least one intrinsic behavior of the electric machine.

2. The method of claim 1, wherein the experimental modal analysis is performed on the electric machine while the electric machine is in a stationary state.

3. The method of claim 1, wherein the operational condition comprises a plurality of certain torque parameters of the electric machine, a plurality of certain speed parameters of the electric machine, or the plurality of certain torque parameters of the electric machine and the plurality of certain speed parameters of the electric machine.

4. The method of claim 3, wherein the operational condition is configurable by using a ramping up or slowing down function.

5. The method of claim 1, wherein the at least first operation parameter comprises at least acoustic pressure and vibration values caused by at least one of: acceleration of the electric machine, velocity of the electric machine, or displacement of the electric machine.

6. The method of claim 5, wherein an accelerometer is used to measure the vibration values.

7. The method of claim 5, wherein a microphone is used to measure the acoustic pressure.

8. The method of claim 1, wherein the structural/vibro-acoustic model comprises at least one of a shape of the electric machine, a structure of the electric machine, or a pressure of the structure form the electric machine.

9. The method of claim 1, wherein the experimental modal analysis comprises at least one of an application of an external physical force to the electric machine, an application of an external physical force to single components of the electric machine, measurement of a vibration/acoustic output, or an estimation of an intrinsic behavior of the electric machine.

10. The method of claim 1, wherein the at least one unitary force represents certain loads of an electric machine.

11. An apparatus for estimating electromagnetic forces active in an electric machine during operation of the electric machine, the apparatus comprising:
   a measuring unit configured to measure at least one first operation parameter of the electric machine while the electric machine is operated under at least one operational condition; and
   an estimating unit configured to estimate electromagnetic forces active in the electric machine during operation of the electric machine by multiplying the measured at least one first operation parameter and a respective second operation parameter provided by a structural/vibro-acoustic model that is generated, adjusted, or generated and adjusted by using at least one intrinsic behavior of the electric machine determined within an experimental modal analysis;
   wherein at least one unitary force is applied to the structural/vibro-acoustic model and the at least one unitary force corresponds to the respective at least one intrinsic behavior of the electric machine.

12. A non-transitory computer implemented storage medium that stores machine-readable instructions executable by at least one processor, the machine-readable instructions comprising:
   measuring at least one first operation parameter of an electric machine while the electric machine is operated under at least one operational condition, and
   estimating electromagnetic forces active in the electric machine during operation of the electric machine by multiplying the measured at least one first operation parameter and a respective second operation parameter provided by a structural/vibro-acoustic model that is generated, adjusted, or generated and adjusted by using at least one intrinsic behavior of the electric machine determined within an experimental modal analysis;
   wherein at least one unitary force is applied to the structural/vibro-acoustic model and the at least one unitary force corresponds to the respective at least one intrinsic behavior of the electric machine.

13. The non-transitory computer implemented storage medium of claim 12, wherein the experimental modal analysis is performed on the electric machine while the electric machine is in a stationary state.

14. The non-transitory computer implemented storage medium of claim 12, wherein the operational condition comprises a plurality of certain torque parameters of the electric machine and/or a plurality of certain speed parameters of the electric machine.

15. The non-transitory computer implemented storage medium of claim 14, wherein the operational condition is configurable by using a ramping up or slowing down function.

16. The non-transitory computer implemented storage medium of claim 12, wherein the at least first operation parameter comprises at least acoustic pressure and vibration values caused by at least one of: acceleration of the electric machine, velocity of the electric machine, or displacement of the electric machine.

\* \* \* \* \*